Sept. 11, 1923.

L. PATTON

INSECT CATCHER

Filed May 24, 1922

Inventor
LUTHER PATTON

Attorney

Sept. 11, 1923.  L. PATTON  1,467,494
INSECT CATCHER
Filed May 24, 1922   3 Sheets-Sheet 2
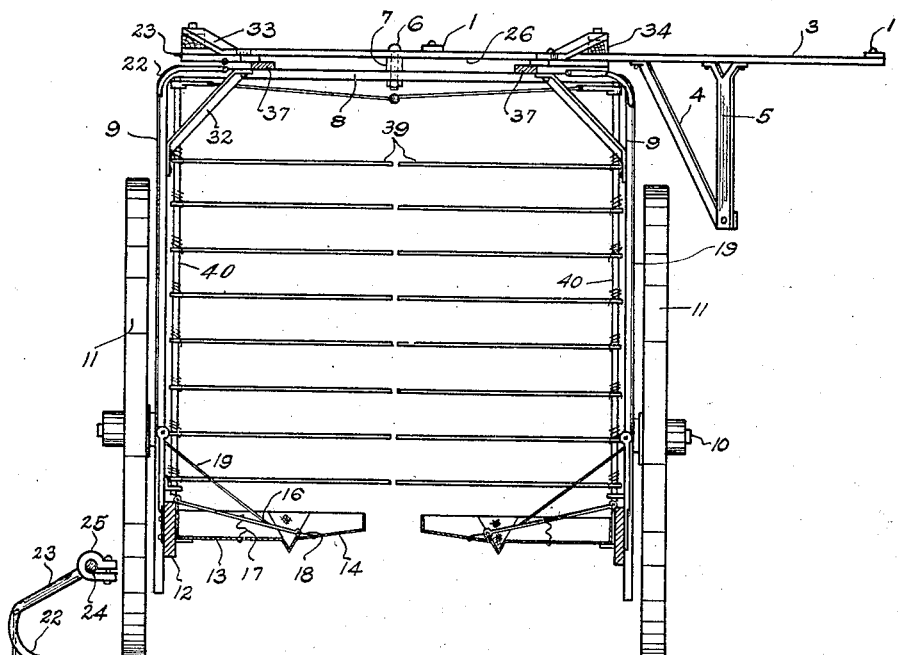
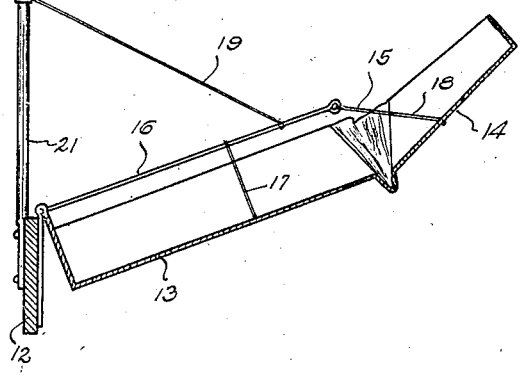
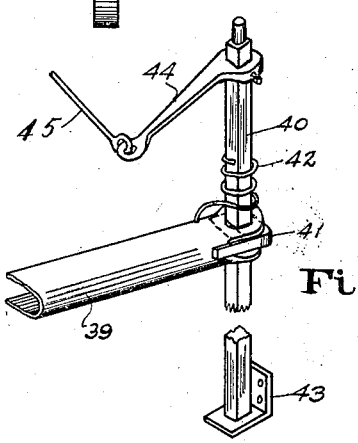
Inventor
LUTHER PATTON Sept. 11, 1923.
L. PATTON
1,467,494
INSECT CATCHER
Filed May 24, 1922
3 Sheets-Sheet 3
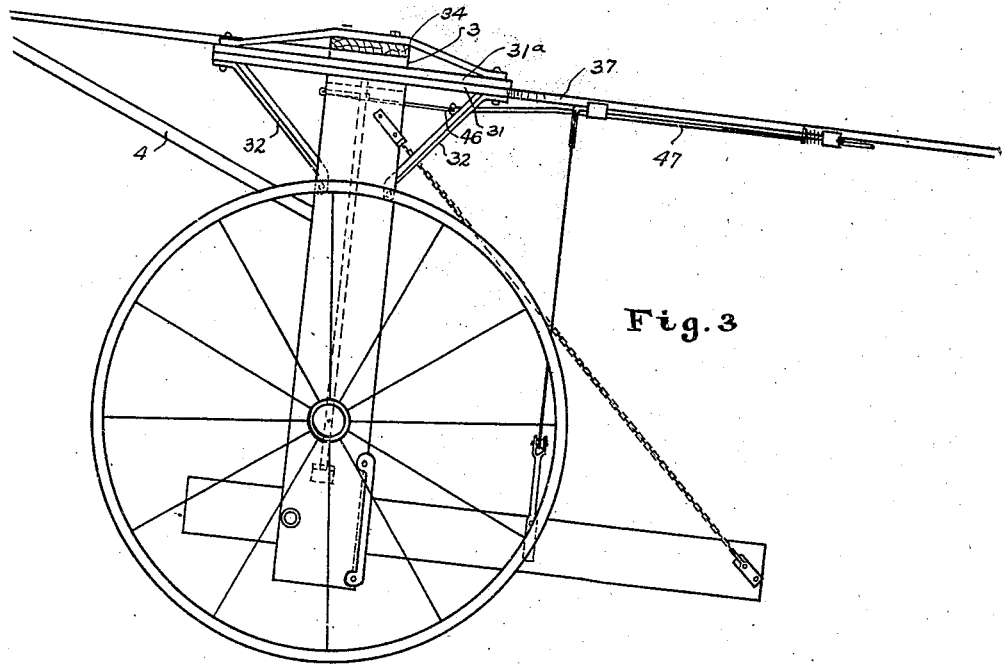
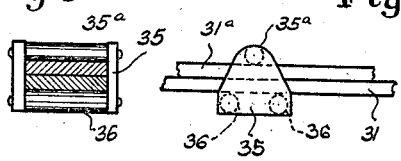
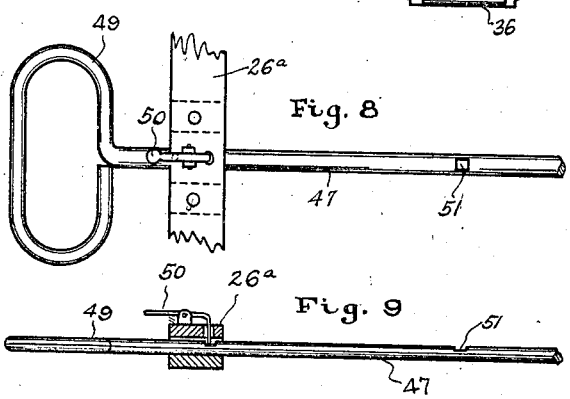
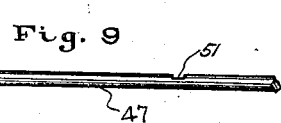
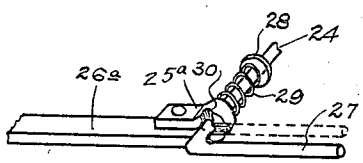
Inventor
LUTHER PATTON.
By
Attorney Patented Sept. 11, 1923.

1,467,494

UNITED STATES PATENT OFFICE.

LUTHER PATTON, OF BIRMINGHAM, ALABAMA.

INSECT CATCHER.

Application filed May 24, 1922. Serial No. 563,393.

*To all whom it may concern:*

Be it known that I, LUTHER PATTON, a citizen of the United States of America, residing at Birmingham, in the county of Jefferson and State of Alabama, have invented certain new and useful Improvements in Insect Catchers, of which the following is a specification.

This invention relates to an improvement in insect catchers of the type in which spaced troughs are mounted in an inverted U-frame and drawn by a draft animal along over a row of plants with suitable shaking appliances within the frame to strike and dislodge insects on the plants causing them to fall into the troughs.

In Letters Patent No. 1,289,250, issued to me on December 31st, 1918, I show an inverted U-shaped frame having hinged sectional troughs adjustably mounted therein, the frame being rigidly connected to the draft rigging.

In a pending application, Serial No. 556,527, filed by me on the 25th day of April, 1922, I have shown the troughs hinged on hanger bars that are pivoted for vertical play to the frame and the frame divided into vertical half sections which were controlled by a common steering handle for the purpose of facilitating the steering and turning of the machine.

My present invention contemplates improvements on my invention aforesaid in the following respects:

1st: I propose to utilize the rigid frame such as that shown in my patent but I connect this frame by a fifth wheel rigging to the draft elements thus obtaining a more complete and perfect steering control of the appliance.

2nd: I have provided an improved means for the mounting and folding back out of position of the spring knocker arms utilized to shake the plants and dislodge the insects.

3rd: I have perfected and improved the means for raising, lowering and adjusting the hinged sectional troughs; and finally 4th: I have improved and perfected the arrangement of the control elements for both the plant shaking appliances and the troughs which are disposed alongside the steering handle in convenient position to be grasped by the operator while walking behind the draft animal on one side of the row of plants being treated.

My present invention further comprises the novel details of construction and arrangements of parts, which are hereinafter more particularly described and pointed out in the appended claims, reference being had to the accompanying drawings which illustrate only the preferred embodiment of my invention, and in which:—

Fig. 2 is a vertical cross-sectional view taken on the line 2—2 of Fig. 1.

Fig. 3 is a side elevation of the machine.

Fig. 4 is an enlarged detail cross-sectional view through one of the pans showing the mechanism for raising it.

Fig. 5 is a detail view of the shaker shaft and its operating crank, the shaft being broken away below the upper knocker.

Fig. 6 is a detail cross-sectional view taken on the line 6—6 of Fig. 1 showing a roller clip.

Fig. 7 is a side elevation of the clip shown in Fig. 6.

Figs. 8 and 9 are enlarged detail views of the shaker handle and its latch.

Fig. 10 is a detail view of the latch means for the trough operating cranks.

Similar reference numerals refer to similar parts throughout the drawings.

Figure 1:
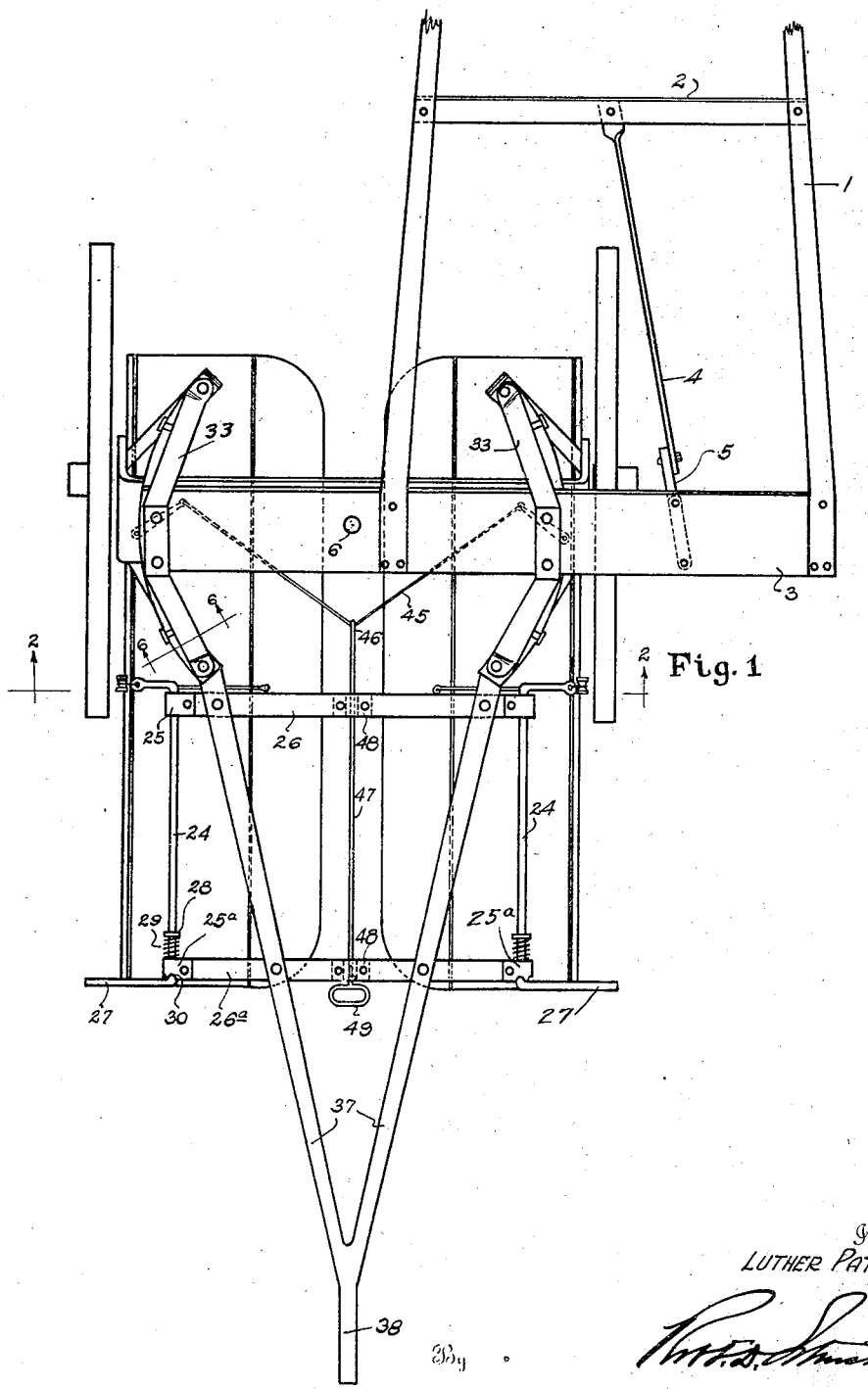
Fig. 1 is a plan view of the machine.

My present invention is shown in the form adapted to be drawn by a draft animal, shafts 1 being provided therefor and having a cross brace 2 which carries the hook or eye, not shown, for the whiffle tree. The shafts are connected at their rear ends to a cross bar 3, one shaft being connected at one end to the bar and the other shaft near the center of the bar. The cross bar 2 between the shafts has connected thereto a center brace bar 4 which at its rear end is connected to a dependent bracket 5 rigidly secured to the underside of the overhung end of the cross bar 3. This cross bar 3 is pivotally connected by a king pin 6 through a spacer sleeve 7 to the top member 8 of an inverted arched or U-frame whose vertical sides 9 carry near their lower ends the outturned stub shafts or axles 10 upon which the wheels 11 that support the machine are mounted. I pivotally attach to the inner side of each member 9 near its lower formed end a trough hanger bar 12 which has hinged thereto the inner rigid portion 13 of its respective trough, this rigid portion being hingedly connected to an outer upwardly foldable trough portion 14 with a flexible joint closure 15 interposed between the sides of the members 13 and 14. A rod 16 extends transversely over the rigid portion of the trough midway between the pivot and rear end of the pan, this rod being hinged to the hanger bar 12 and having cable connections 17 and 18 respectively to the trough sections 13 and 14. An operating cable 19 extends upwardly from near the free end of each rod 16 and passes under a pulley 20 mounted on a standard 21 bolted to the adjacent hanger bar 12. Thence the cable extends upwardly and is made fast in the upper end of an arcuate channel member 22 depending from the free end of a crank 23 at the end of a shaft 24. Each shaft 24 is journaled in a bearing 25 at the ends of a cross bar 26 parallel with the bar 5 and supported in the manner hereinafter described.

These crank shafts 24 extend rearwardly and near their rear ends are journaled in bearings 25ᵃ carried by a rear cross bar 26ᵃ. The rear ends of the crank shafts 24 are outturned to form operating handles 27 which are disposed in convenient reach of the operator for the purpose of raising and lowering the troughs by rocking the crank shafts and pulling the cables 19 upwardly. Each crank shaft 24 carries a washer 28 between which and the adjacent bearing 25ᵃ is interposed a coil spring 29. This tends to draw the operating handle 29 into one of a series of notches 30 provided in the bearing 25ᵃ and thus serving to hold the trough supported in the desired adjustment.

I do not claim as a part of my present invention the arrangement of the side hanger bars 12, nor of the troughs hinged thereto, nor the jointed troughs, the same forming the subject matter of my said pending application and patent. My present invention is concerned with the manner of raising and lowering and of adjustably supporting the hinged sectional troughs.

In order to provide the greatest facility for turning the machine at the ends of rows and of guiding it over the plants, I connect the frame proper to the cross bar 3 by a fifth wheel arrangement which will now be described.

The top frame member 8 has rigidly bolted thereto near each end a lower fifth wheel element 31 in the form of a curved bar overhanging to the front and rear of the cross bar and braced thereto near its ends by downwardly inclined braces 32 which are suitably connected to the front and rear edges of the adjacent frame side 9. The cross bar 3 has bolted to its under side two corresponding fifth wheel elements 31ᵃ which are substantially similar to 31 and rest thereon and each of which is braced at its outer ends by a bar 33 which extends upwardly over a block 34 and is bolted therethrough to the cross bar 3. Each pair of engaging fifth wheel members 31 and 31ᵃ are connected and held in operative relationship by a pair of U-frames 35, each having a top roller 35ᵃ engaging the upper fifth wheel member 31ᵃ and having journaled in its lower open end a pair of spaced rollers 36 which engage the underface of the lower fifth wheel member 31. One of these connecting clips is provided between the cross bar 3 and each end of the fifth wheel members and both are free to float in the members they connect, thus permitting the maximum range of play for the fifth wheel members. Handle bars 37 diverge from a steering handle 38 and each is connected at its forward end to the rear end of its respective lower fifth wheel member 31. These handles 31 are bolted to and serve to support the cross arms 26 and 26ᵃ. By this arrangement the frame can be readily swung about its king pin and the machine turned in the shortest possible compass.

Over each trough I provide a vertical series of knockers 39, each preferably formed by a strip of sheet metal bent crosswise of its length into hollow U-shape and provided at one end with a round opening adapted to receive and pivot about the square control shaft 40. The pivoted end of each knocker is bifurcated so that a stop arm 41, fast on the shaft 40, can project forwardly between its bifurcations and serve to stop the forward swing of its respective knocker responsive to the action of a coil spring 42 secured to the shaft and engaging the rear edge of the knocker (see Fig. 5). The ends of the control shaft 40 are rounded so as to be stepped into bearings formed by aligning holes in the top frame member 8 and in an angle 43 bolted to the bottom of the U-frame sides 9. Near its upper end each shaft 40 receives a crank 44 which is inclined forwardly and has an eye at its free end in which an operating link 45 is connected. These two links are connected to an eye 46 at the forward end of an operating rod 47 which is free to slide in bearings 48 attached to the under side of the bars 26 and 26ᵃ and which at its rear end projects beyond the bar 26ᵃ and carries an operating handle 49. By drawing this bar 47 rearwardly the shafts 40 are rocked so as to cause the several stops 41 for the knockers 39 to engage and swing the knockers rearwardly into parallelism with the sides of the frame. When the knockers are thus folded back, by grasping the crank arms 27 the troughs can be folded up against the knocker shafts and knockers and all inwardly projecting elements of the machine disposed out of the path of a stump, rock or other projection which it is desired to avoid. This latch comprises a spring-pressed finger piece 50 pivotally mounted on the top of the bar 26ᵃ and adapted to engage in one of the other of the grooves or notches 51 formed in the operating rod 47, the notches being so arranged that the rod can be held in its inner or outer position, i. e., with the fingers in operating or in retracted position.

In operation, having assembled the parts in the manner described, the operator walks between rows behind the draft animal with one hand grasping the handle 38 and steering the machine so as to follow the row of plants being treated. At the end of the row the whole frame can be swung on the fifth wheel so as to make a sharp turn about and if desired the handle 49 can be unlatched and the knockers swung out of operative position and then the two handles 27 can be drawn rearwardly to clear their notches 30 and then swung to lift and fold the pans up against the sides of the frame in which position they are held by the engagement of the cranks 27 in the top notches 30.

If it is desired to fold up the troughs partly it will be observed that the flexible connections from the rods 16 are so arranged that when the rods are first pulled upwardly by the cables 19 the inside hinged ends of the troughs will be first pulled up so as to give an increased width of opening between the troughs, and the cranks 27 can be latched in the side notches 30 (see full lines Fig. 9) to hold the troughs in this position. On further raising of the rods 16, the troughs as a whole are swung upwardly on their hinges connecting them to the side bars 12. As hereinbefore stated, the arrangement of the trough hanger bars 12, the manner of mounting them to hinge on and rock about the frame, and the manner of supporting their rear ends from the frame, form no part of my present invention. The knockers are of very desirable construction in that they are light and present a rounded edge to strike the plant which will have the least tendency to damage the plants. The ease with which they may be all folded into and out of position is a distinct advantage of my present construction.

Though I have described with great particularity the details of the embodiment of the invention herein shown, it is not to be construed that I am limited thereto as changes in arrangement and substitution of equivalents may be made by those skilled in the art without departing from the invention as defined in the appended claims.

Having thus described my invention, what I claim as new and desire to secure by Letters Patents, is:—

1. In an insect catcher of the character described, a frame having plant shaking appliances and troughs for catching the dislodged insects, said troughs having their adjacent inner portions hinged to the main body portion of the troughs and adapted to be swung upwardly, and operating connections to lift the troughs, said connections comprising a hinged arm and separate flexible connection therefrom to each hinged section of its respective trough, and means to raise and lower said arm.

2. An insect catcher in accordance with claim 1, in which the flexible connections from each hinged trough lifting arm are so connected to their respective trough sections that the raising of the arm will lift the inner trough section adjacent to the plants in advance of the outer section remote from the plants.

3. In an insect catcher of the character described, an arched wheel supported frame carrying troughs and plant shaking appliances, a draft rigging connected to the frame, a steering handle for the frame extending rearwardly, and means for raising and lowering the troughs comprising operating cranks disposed adjacent to the handle.

4. In an insect catcher of the character described, an arched wheel supported frame carrying troughs and plant shaking appliances, a draft rigging connected to the frame, a steering handle for the frame extending rearwardly, means for raising and lowering the troughs comprising shafts having their operating cranks disposed adjacent to the handle, and means for folding the plant shaking appliances into and out of operating position comprising a handle disposed adjacent to the steering handle.

5. An insect catcher in accordance with claim 4, in which the operating handle for the plant shaking appliances co-operates with a latch means to lock said appliances in their operative and in their inoperative positions.

6. An insect catcher in accordance with claim 4, in which said cranks co-operate with latch means to hold them in different adjusted positions.

7. In an insect catcher, a wheel supported frame a vertical bar on each side mounted to turn in the frame, a series of bent metal shakers having bifurcated apertured ends mounted to rotate horizontally on said bar, stop arms rigid on the bar and adapted each to engage the bifurcated ends of its respective arm to stop it in operative position, spring means to press said arms towards their operative position, and operating means to rock said bar so as to swing said arms into and out of operative position.

In testimony whereof I affix my signature.

LUTHER PATTON.

Witness:
NOMIE WELSH.